May 22, 1956 H. L. LESIGNE ET AL 2,747,022

AUTOMATIC TELECOMMUNICATION SWITCHING SYSTEM

Filed June 16, 1952 2 Sheets-Sheet 1

INVENTORS
HENRI L. LESIGNE
JEAN G. DEMARTRES
BY Adams + Bush
ATTORNEYS

INVENTORS
HENRI L. LESIGNE
JEAN G. DEMARTRES
BY Adams & Bush
ATTORNEYS

United States Patent Office 2,747,022
Patented May 22, 1956

2,747,022

AUTOMATIC TELECOMMUNICATION SWITCHING SYSTEM

Henri Louis Lesigne, Vanves, and Jean Georges Demartres, Paris, France, assignors to Compagnie Industrielle des Telephones, Paris, France Application June 16, 1952, Serial No. 293,758

Claims priority, application France July 5, 1951

1 Claim. (Cl. 179—18)

Figure 1A:
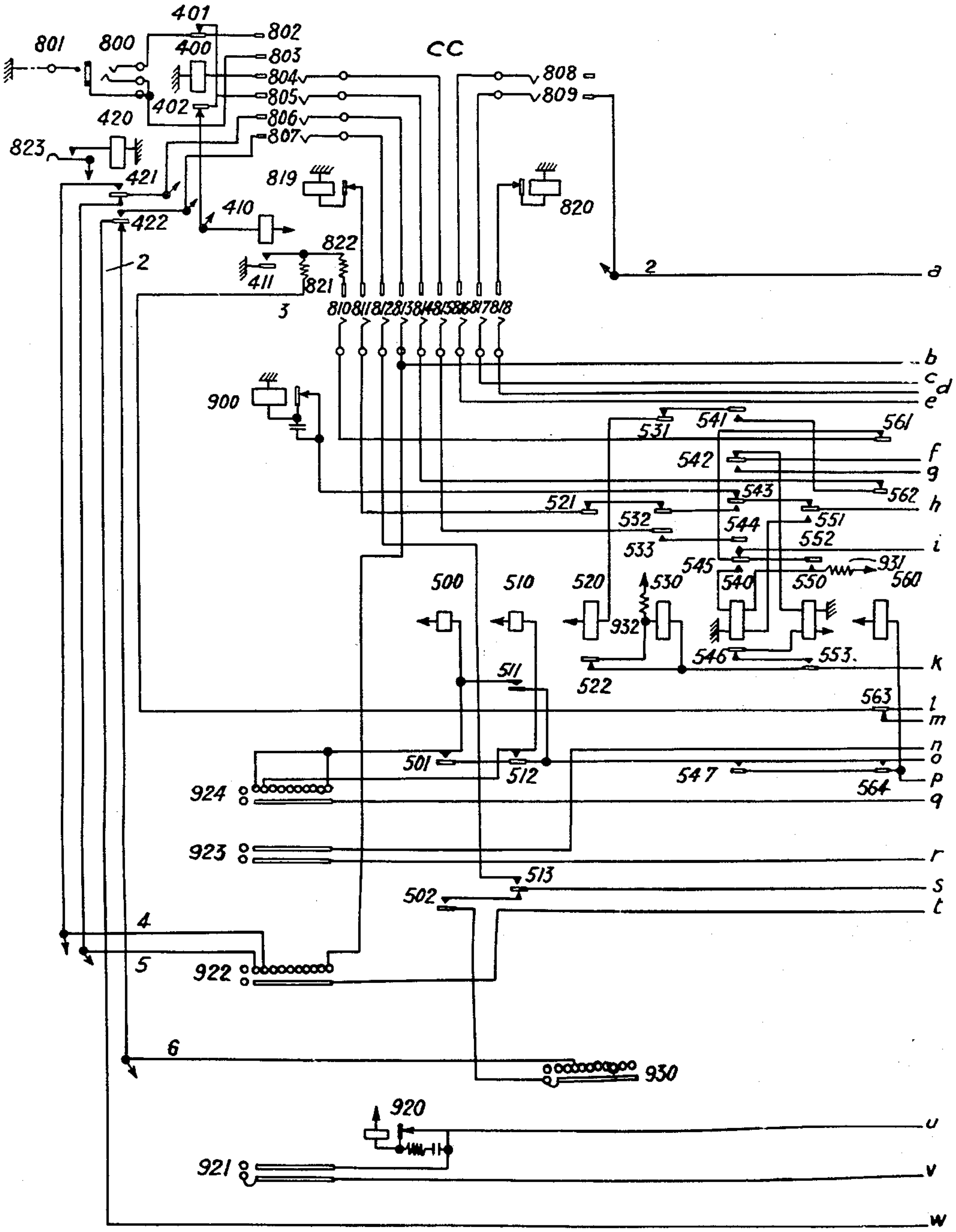
Figure 1:
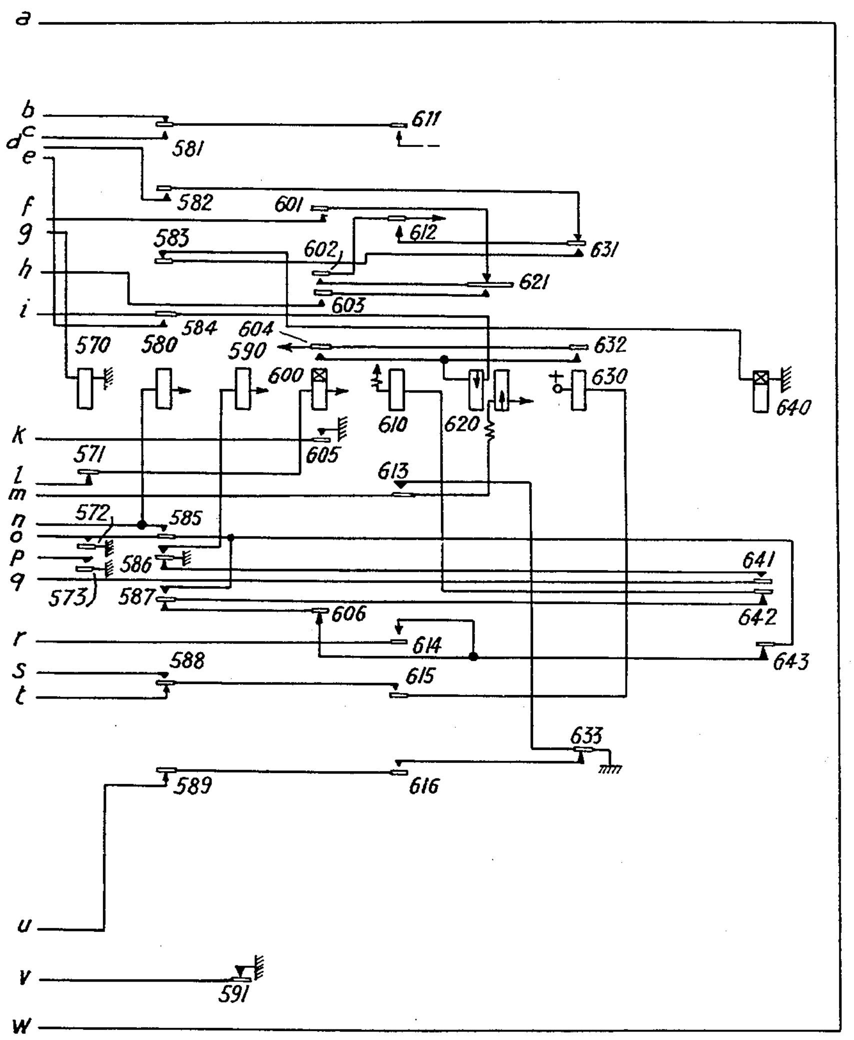

An automatic telecommunication system has been described which comprises the following elements: a plurality of registers each of which contains a digit switch and a battery; link circuits each of which comprises a line finder and a selector and may be connected to any register; a marking wire multipled at one end to a contact of the digit switch of each register and at its other end to a contact of each selector; a first connection between a battery pole and the digit switch wiper; and a second connection between the other battery pole and a selector wiper of the link circuit when the link circuit is connected to the register. The selector is set in accordance with the position assumed by the digit switch.

The system according to the present invention is concerned with an improvement of this known system. Its object is to give a calling line the possibility of being connected, in the line group of the desired direction, with a given line which, by the operation of a switching device, is no longer accessible to the other calling lines and is thus allotted to this calling line.

The system according to the invention presents the following characteristics: a device is provided enabling the simultaneous disconnection of the marking wire from the digit switch contact, the connection of the portion of the marking wire which is connected to the contact banks of selectors with a wire multipled to a contact of a contact bank of each line finder and the connection of that portion of this first connection which is adjacent to the first mentioned pole of the battery with the wiper, which hunts over this contact bank, of the said line finder. The selector is then set by the closure of a circuit passing over the contact of the finder of the calling line instead of a contact of the digit switch.

The invention will be described with reference to the accompanying figure which diagrammatically illustrates an embodiment of the invention.

In this figure, the contacts of a relay are all shown on the vertical line passing over the relay. The terminals of the battery special to each register are represented and will be hereinafter designated by the symbols + and —, the negative pole of the general supply batter will be termed "battery," the positive pole of this battery, which is grounded, will be termed "ground."

In the following description the case of a line for which the device according to the invention is not used and the case of a line for which it is used will be considered successively. In the first case the key 823 relative to this line is not operated and the relay 420 relative to the line is therefore unenergized. In the second case the key 823 is energized and the relay 420 is operated.

It is assumed that an operator plugs in her plug 801 into the jack 800. Relay 410 operates over 402, 401, 800, 801 and ground. Relay 410 is common to a number of, say 100, lines. Any one of these lines may be reached by any link circuit CC belonging to a group of link circuits, numbering 15 for instance. Relays 600 and 620 of the register operate over 571, 563, wire 3, 821, 411 and ground.

Finder 900 is actuated over: ground, 900, 543, 551, 603, 621, 602, battery; it hunts for an idle link circuit in the group in question. When it encounters such a circuit it stops owing to the release of the differential-winding relay 620, whose upper winding is energized over: battery, 604, 545, 561, 810, 822, 411, ground.

Relay 550 operates over: 542, 601, 621, 602, battery and locks over: 546, 553, 605, ground.

Resistance 931 is shunted over 545 and 552 on the circuit above described for the upper winding of relay 620. This relay is no longer balanced and is energized again. Relay 540 operates over ground, 540, 551, 603, 621, 602, battery and then locks over: battery, 931, 540, 545, 561, 810, 822, 411 and ground.

Relay 550, whose circuit is opened at 546, falls back and finder 819 rotates over: ground, 819, 811, 521, 432, 543, 551, 603, 621, 602, battery.

When the calling line is encountered relay 520 operates over: battery, 520, 531, 541, 562, 814, 805, 401, 800, 801, ground; the finder 819, whose circuit is opened at 521, stops, and relay 530, which is no longer short-circuited at 522, operates over 605, ground; it releases 520 at 531 and energizes 400 in series with the upper winding of 620, which falls back: ground, 400, 804, 815, 533, 544, 620, 604, battery.

Relay 410 falls back, its circuit being opened at 402; relay 530, short-circuited at 522, falls back; relay 570 operates over 542, 601, 621, 602, battery; it releases 600 at 571 and energizes 560 at 573; relay 540, whose circuit is opened at 561, falls back.

Relay 610 operates over: battery, 610, 642, 587, 606, 643, 572, ground; it energizes 620 over 613 and steps switch 920, over 589, 616, 633, ground. Relay 630 is energized: +, 630, 615, 588, 922, wire 5, 421, 806, 813, 581, 611, —.

The energization circuit of 920 is opened at 633 and 920 stops on the position of wire 5 which corresponds to the stopping position of finder 819.

The operator receives dial tone. She dials one digit, thus setting digit switch 930 by known means, which will not be described here.

640 is energized: ground, 640, 583, 631, 612, battery.

500 is energized: battery, 500, the contact of bank 924 whose orientation corresponds to that of the contact of bank 922 which is connected to wire 5, 641, 586 and ground. It locks over 501 and 572.

The energization circuit of 610 is opened at 642, and 610 is released.

The energization circuit of 640 is opened at 612 and 640 falls back.

610 is again energized: battery, 610, 642, 587, 606, 643, 572 and ground.

580 is energized: battery, 580, 923, 614, 643, 572, and ground. It locks: 585, 572, ground.

610 is held over: 642, 587, 572 and ground.

The energization circuit of 630 has been opened at 588 normal but has been prepared at 588 operated: +, 630, 615, 588, 513, 502, 930, wire 6, 422, marking wire 2, contact 809 of selector 820. There is one wire 2 and one front contact 422 for each outgoing line assigned to a given calling line. The back contacts 422 are strapped.

Selector 820 rotates: battery, 612, 631, 582, wiper and contact 818, interruptor and winding of 820, ground.

When the marking wire 2 is encountered, the above circuit prepared for the operation of 630 is completed by: wiper 809, 817, 581, 611, —.

630 operates and opens at 631 the energization circuit of 820, which stops.

It will thus be seen that selector 820 has stopped in conventional manner on the marking wire 2 designated by the digit switch 930 previously set by impulses originating in the operation of the calling subscriber's dial.

Wire 5 only exists for certain jacks, viz. those for which it is desired to allot a line on the called side. For the others switch 920 rotates until it reaches its last position; the energizing circuit of 630 is then the following: +, 630, 615, 588, the last contact of bank 922, 581, 611, —. Relay 500 is here actuated over the last contact of bank 924: battery, 500, the mentioned contact, 641, 586, and ground. The operations then proceed further as has been stated above from the moment relay 500 has been operated.

Let us now consider a line whose key 823 has been operated.

The above described operations which take place after the operator has plugged in are not modified to the moment switch 920 begins rotating. From that moment on they become the following:

Relay 630 energizes over: +, 630, 615, 588, 922, wire 4, 421, 806, 813, 581, 611, —; the energization circuit of 920 is opened at 633, 920 stops and 640 energizes over 583, 631, 612 and battery.

Relay 510, operated over 924, 641, 586 and ground, locks over 512, 572, ground; relay 500 is energized over 511, 572 and ground; it locks over 501, 572 and ground; relay 610, whose circuit is opened at 642, falls back; it releases 630 at 615, 640 at 612 and 620 at 613.

610 is energized over: 642, 587, 606, 643, 572, and ground.

Relay 580 is energized over: 923, 614, 643, 572 and ground.

Relay 590 is energized over 586, and switch 920 is homed over 591.

610 is held over: 642, 587, 572 and ground.

620 is energized over 613 and 633.

820 is energized over: 818, 582, 631, 612 and battery, and rotates.

Relay 630 is then energized in the marking circuit: +, 630, 615, 588, 513, 812, 807, 422, wire 2, 809, 817, 581, 611, —.

The circuit of selector 820 is opened at 631, and the selector stops.

It will appear that selector 820 stops on the outgoing line assigned to the contact on which the line finder 819 has stopped.

A group of several outgoing lines may be unitarily assigned to a group of several incoming lines. In that case each of the two wires connecting contacts 421 and 422 to contacts 806 and 807 may be multipled to several contacts of each finder. The different corresponding jacks are of course placed under the supervision of the same operator.

We claim:

In a telecommunication exchange an automatic switching system comprising: a plurality of registers each of which contains a digit switch and a battery; link circuits each of which comprises a line finder and a selector and may be connected to any register; a marking wire multipled at one end to a contact of the digit switch of each register and at its other end to a contact of each selector; a first connection between a battery pole and the digit switch wiper; a second connection between the other battery pole and a selector wiper of the link circuit when the link circuit is connected to the register; and means for disconnecting the marking wire from the digit switch contact, for connecting the portion of the marking wire which is connected to the contact banks of the selectors with a wire multipled to a contact of a contact bank of each line finder and for connecting that portion of this first connection which is adjacent to the first mentioned pole of the battery with the wiper, which hunts over this contact bank, of the said line finder.

References Cited in the file of this patent

UNITED STATES PATENTS

| | | |
|---|---|---|
| 2,452,578 | Kruithof et al. | Nov. 2, 1948 |
| 2,547,043 | Pouliart | Apr. 3, 1951 |